United States Patent [19]

Plegat

[11] 3,948,129
[45] Apr. 6, 1976

[54] PRESS INCORPORATING A DEVICE FOR QUICK INTERCHANGE OF TOOLS

[75] Inventor: Alain Edouard Plegat, Asnieres, France

[73] Assignee: Societe Anonyme des Usines Chausson, France

[22] Filed: Sept. 11, 1974

[21] Appl. No.: 505,167

[30] Foreign Application Priority Data
Oct. 19, 1973 France .................. 73.37428

[52] U.S. Cl. ............... 83/157; 72/444; 83/411 R; 83/417; 83/571; 83/637; 83/698
[51] Int. Cl.² .................................. B26D 7/06
[58] Field of Search ......... 83/157, 411 R, 417, 571, 83/637, 698; 72/444, 446; 100/224, 229

[56] References Cited
UNITED STATES PATENTS

| | | | |
|---|---|---|---|
| 1,164,026 | 12/1915 | Stevenson | 83/571 X |
| 3,229,791 | 1/1966 | Soman | 83/698 X |
| 3,452,632 | 7/1969 | Brolund | 83/698 X |
| 3,559,522 | 2/1971 | Valente | 83/571 |
| 3,848,494 | 11/1974 | Gargrave et al. | 83/698 X |

*Primary Examiner*—Frank T. Yost
*Attorney, Agent, or Firm*—Flynn & Frishauf

[57] ABSTRACT

A support plate is permanently fixed on the table of the press, which plate has mounted on the top thereof rollers, lateral guides and an abutment. Sets of tools are used, each of them comprising an upper tool and a lower tool. They are connected together by guiding columns and safety upright, so as to have always a constant total height. When being installed the sets of tools are located, or removed by moving the bed-plate of the lower tool on the rollers of the support plate. After placing and locating the tools, the bed-plate of the lower tool is clamped on the support plate and the bed-plate of the upper tool is clamped on the slide member of the press. After removal of the safety upright, the press is then ready to operate.

11 Claims, 10 Drawing Figures

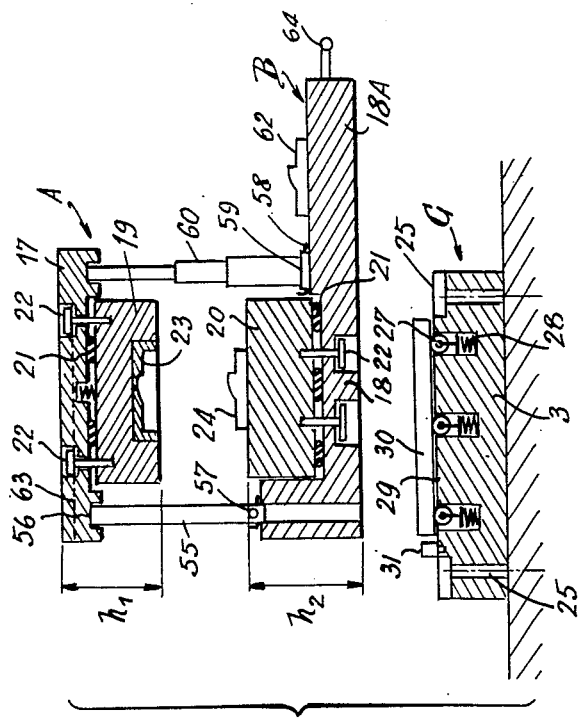
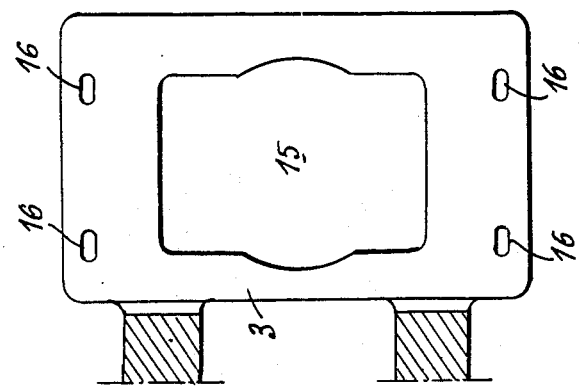

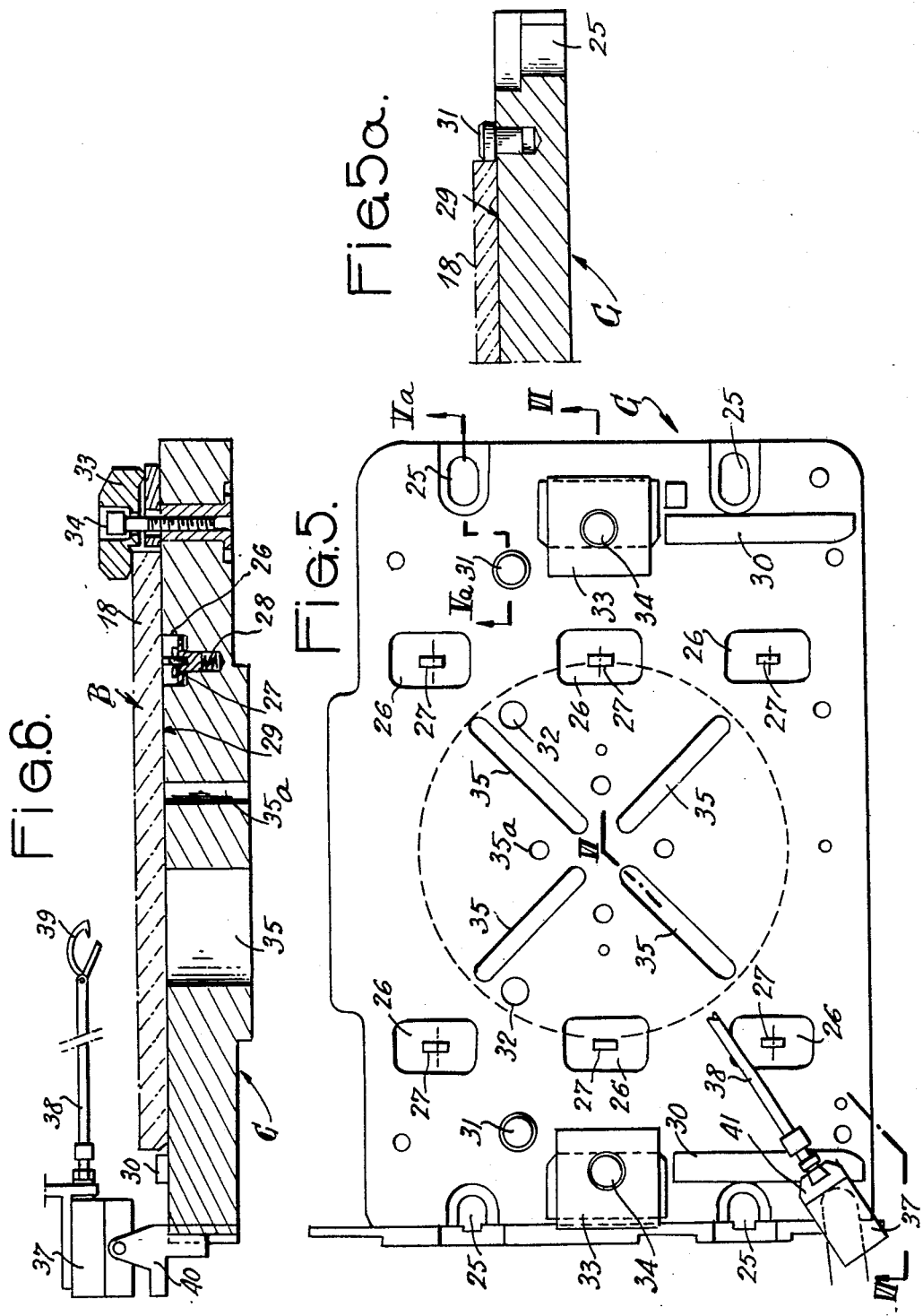

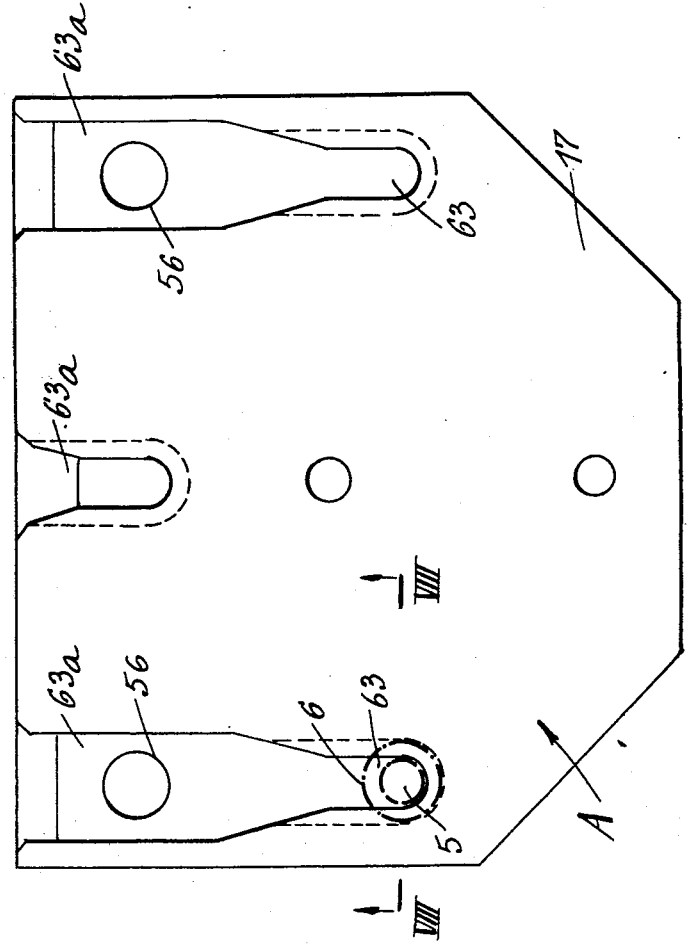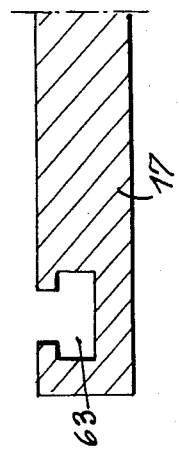

PRESS INCORPORATING A DEVICE FOR QUICK INTERCHANGE OF TOOLS

This invention relates to stamping and cutting presses, regardless of power and specific construction and more particularly to presses which have either a mobile upper slide or a mobile table.

It is important that stamping presses work with very short idle time and, that, consequently, the tools fixed thereto can be interchanged quickly. This is very important especially when like parts have to be manufactured in a relatively small quantity so that the manufacturing steps to which the press is assigned will change frequently, for example several times in a working day.

Very often, the presses are part of a production line. The successive presses of said line should have associated die holders which, of course, should not require removal nor adjustment at each tool interchange, even when the holders are automatically brought between the mobile elements of a press when the mobile elements are separated.

It is an object of the invention to solve the problem of quick interchange of the working tools of a press without requiring adjustment on the tools, so that the tool interchange can be performed by unskilled operators.

SUBJECT MATTER OF THE INVENTION

According to the invention, the press incorporating a device for a quick change over of the tools comprises an intermediate or support plate fixed on the table of the press to support the lower tool of a tool set. The intermediate plate has rollers as well as at least one set of lateral guides and an abutment, located on the top of the plate. The guide and said abutment correspond to complementary portions provided on the be plate of the lower press tool of the sets of upper and lower tools. Each tool set corresponds to a given operation to be made by the press. The top of the upper press tool of each set is formed with open grooves. The position of said open grooves faces stay rods with protruding heads which are placed in the grooves of the plate, and are secured to the press slide and controlled by jacks. The lower tool and the upper tool further are supplied with removable spacer rods ensuring a constant spacing between them and their mutual centering during set up and when said tools are not yet firmly connected to the press.

Various other features of this invention are shown in the following detailed description.

An embodiment of this invention is shown by way of nonrestrictive example in the accompanying drawing, wherein:

FIG. 3 is a plan view of one of the components of the press.

FIG. 4 is a diagrammatic sectional-elevation view of a device for quick interchange of the tools of the press of FIG. 1.

FIG. 5 is a plan view of an intermediate plate constituting one of the elements of the device of FIG. 4.

FIG. 5a is a sectional view of a detail of FIG. 5, taken along line Va—Va of the figure.

FIG. 6 is a partial and partly diagrammatic sectionalelevation view taken along line VI—VI of FIG. 5.

FIG. 8 is a plan view of another tool shown in FIG. 4.

FIG. 8a is a sectional view taken along line VIIIa—VIIIa of FIG. 8.

Figure 2:
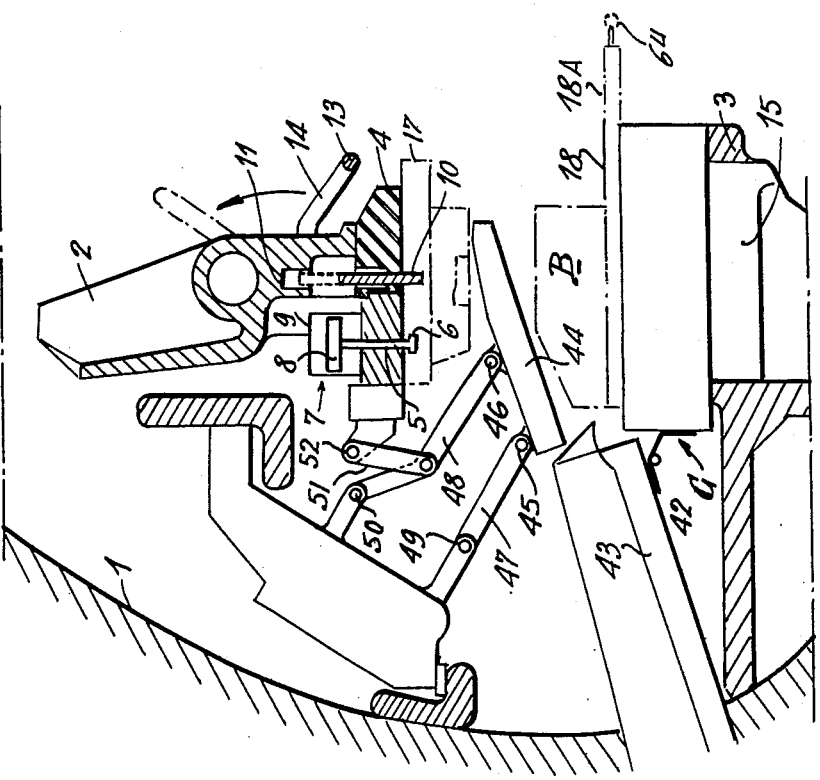
FIG. 2 is a diagrammatic sectional view of the stamping press of FIG. 1, after a rotation through 90.
Figure 1:
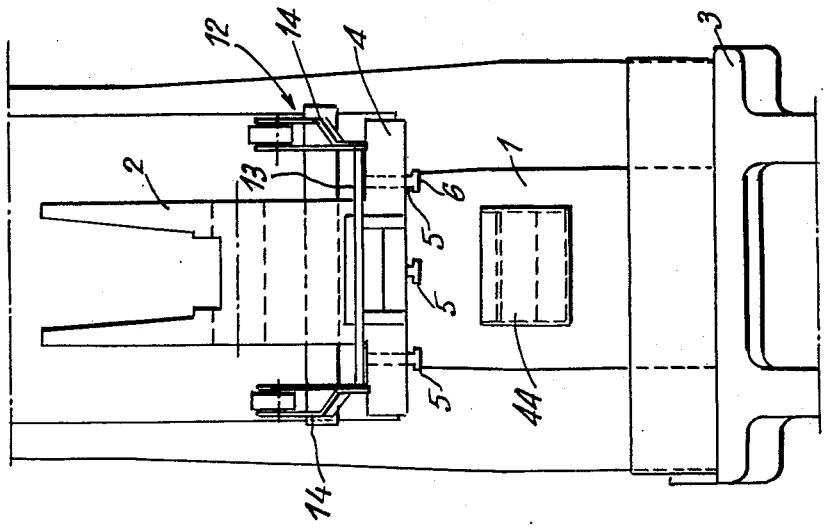
FIG. 1 is a partial diagrammatic elevation of a stamping press embodying this invention.

FIGS. 1 and 2 show a stamping press having a frame diagrammatically represented at 1, an upper or slide 2, and a lower portion or table 3. At its lower portion, the slide 2 forms a platen 4. The platen 4 is apertured, and three stayrods 5, pass therethrough. The ends of the rods 5 protrude below the platen 4 and form a head 6 which may have a circular, rectangular or any other shape. The stay-rods 5 are guided inside the platen 4 and are connected to jacks which can be of the screw type, of the hydraulic type, or of the pneumatic type. FIG. 2 shows one of the stay-rods 5 in a pneumatic jack 7 connected to a piston 8 which can slide in a cylinder 9.

The platen 4 is also further apertured to receive at least one ejection rod 10 controlled by a jack cylinder 11 or by any other mechanical device usual in the art.

A control device 12 is located in front of the press. It comprises a handle 13 connected to levers 14 which are connected to a mechanism, not represented, provided to lift the ejection rod or rods 10 by a distance sufficient so that rod, or rods 10 will not protrude below the platen 4 at least when interchange, or changing over of the press tools as described hereinbelow is carried out.

The press table 3 can be of any shape. It may have an opening 15 (FIGS. 2, 3) over a major portion of its surface for example when the press must work in a double press arrangement so that it is supplied with devices or apparatus passing through the table 3 to control some of the tools supported. thereby.

As usual, press tables, like that one represented in FIG. 2, are provided near their edge with holes 16 (FIG. 3) typically in the form of button holes for passage of bolts or other attaching components for the lower press tool. Holes 16 must be made, if by chance, the holes 16 are not already provided in the press table 3.

FIG. 4 shows the device for a quick change over of the tools of the press of FIG. 1 which forms the main feature of this invention. An upper tool A is supported by the platen 4 of the press; a lower tool B is supported by the table 3; and a support plate C is placed intermediate the table 3 and the tool B.

In a well-known way, the tools A and B are each provided with bed-plates 17, 18, to which are connected tool supports 19, 20, by means of springs or other resilient means 21 and stroke restricting studs 22. The tool supports 19, 20 could be integral with bed-plates 17, 18 but that is rather unusual in stamping tools.

The tools themselves are formed by a die 23 placed in the tool support 19 and by a punch 24 secured on the tool support 20.

In accordance with a feature of this invention, all the tools to be placed on a same press, or on a same type of press are so located that the total of the heights $h_1 + h_2$ (FIG. 4) of both tools A and B be always the same.

The support plate C is directly fixed on the table 3 for example by means of countersunk bolts passing through the holes 16 as well as through holes 25 also in the form of button-holes as shown in FIGS. 4 and 5. The intermediate support plate C must be placed with a great accuracy because afterwards it determines the positions which the tools B and A, whatever the tools may be, will occupy. Plate C is permanently placed on the table 3 and consequently it is the same plate which is utilized whatever may be the set of tools A and B which will be used later on.

As shown in FIGS. 4 – 6, the plate C has recesses 26. Said recesses are used as housings for rollers 27 supported by springs 28 or other resilient elements. The springs 28 are so dimensioned that the rollers will project slightly beyond the top 29 of the plate C, while the rollers can be received inside their housings 26 when the tool B is clamped on the top 29 of the plate C.

Plate C has at least two lateral guides 30, (FIGS. 5, 6) on its top 29. The guides 30 can be removable in order to be interchangeable if the press must be provided with sets of tools of very different shape.

Besides the guides 30, the top of plate C has abutments 31 (FIGS. 4, 5) which, as seen in FIG. 5, are studs with protruding heads, the studs being engaged into holes 32 of plate C. Several sets of holes 32 can be provided if desired.

The top 29 of the plate C is further provided with removable clamps 33 which can be tightened by means of bolts 34 to ensure positioning of the bed-plate 18 of the tool B when said bed-plate is placed on plate C. The tightening of the clamps 33 on the bed-plate C results in compression of the springs 28 or other resilient compoents supporting the rollers 27 so that the bottom of the bed-plate 18 of tool B will directly bear on the top 29 of plate C.

Advantageously and as shown in FIG. 5, the plate C can also have radially extending apertures 35 as shown in FIG. 5 as well as holes 35a. These apertures and holes permit placement of blades and pins which can thus entirely pass through plate C. If matching suitable apertures are provided in the bedplate 18 and support 20 of the tool B, ejection of components or working tools such as cutting tools or lifting tools when the press works is used with a double effect arrangement, can thus be controlled.

According to an additional feature of this invention, the plate C is provided with an operating and supporting mechanism (FIG. 6) for a handling tool 38 for example a gripper 39. Mechanism 37 is connected to the plate C by a bracket 40. Support mechanism 37 has a mortise-and-tenon, or other quick-release coupling to a holding housing 41 (FIG. 5) for one end of the handling tool 38, which can thus be easily changed over depending on the nature of the set of tools A – B carried by the support plate C. For example, the tool 38 can be provided, as described, with the gripper 39 or can comprise electromagnetic means or any other device making possible, as described below, the transfer of the blank or work piece from the loading position of this blank to the working position, i.e. exactly between the tools 23 and 24.

Plate C also has a lateral support 42 (FIG. 2) for a pickup head or other conveyor 43 for parts brought from an ejection scoop 44 which is introduced between the two tools A and B upon the opening of the press. The scoop 44 is connected by two hinges 45, 46 to the ends of connecting- rods 47, 48 whose head is hinged on spindles 49, 50.

The ensure synchronism between the motion of the scoop and the motion of the press, a connecting rod 51 is hinged, on one hand, on the connecting rod 48 and, on the other hand, on a spindle 52 connected to platen 4. Because of this arrangement, when the slide of the press goes down, the arm 48 is pushed by the connecting rod 51 downwards, whereby both the connecting rods 48 and 47 rotate around their spindles 49, 50, in taking away the scoop 44 from the trajectory of the tools A – B and bring the said scoop 44 above the head 43. The scoop is sharply stopped upon the end of the stroke of the tools A – B, which has for its effect to drop the part contained therein in the conveyor head.

Figure 7:
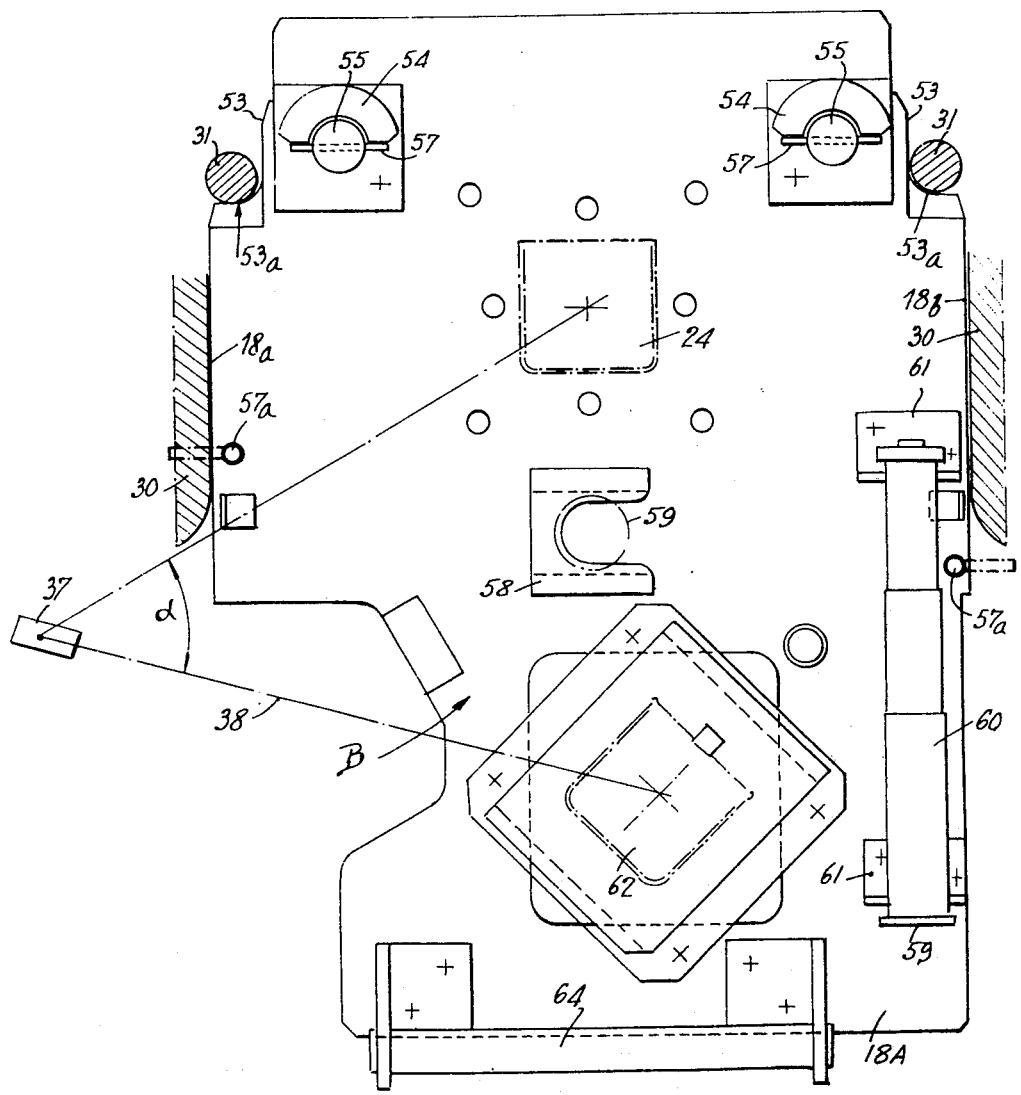
FIG. 7 is a plan view of one of the tools shown in FIG. 4.

FIGS. 7 and 8 show a first type of a set of tools, respectively B and A. The bed-plate 18 of tool B has lateral notches 53 (FIG. 7) having a bottom 53a forming a partial engagement surface of the abutment studs 31 of the plate C.

FIG. 7 shows that in the represented position, the tool B can occupy only one position when brought in abutment against the stop studs 31 while being held between the guides 30. Besides, upon motion of the tool to bring it against the studs 31, the lateral sides 18a, 18b of the bed-plate 18 are guided by the corresponding sides of the guides 30.

The rear portion of the tool B comprises guides 54 for guiding columns 55 which are designed to connect the tool B to the tool A during set-up (FIG. 4). The top of columns 55 is fixed in housings 56 of said tool A. Pins 57 are designed to be engaged through the columns 55 to stop them in a position by which the tools A, B are separated.

The bed-plate of the tool B also includes a holder 58 for locating base 59 of a safety upright 60 designed to be thus inserted between said bed-plate 18 of tool B and the bed-plate 17 of the tool A as shown in FIG. 4.

After the tools are placed and fixed to the press as explained hereinbelow, the safety upright 60 is removed and placed flat on the bed-plate 18 of the tool B which, as seen in FIG. 7 has support holders 61. Similar holders 57a are provided to place the pins 57 on base plate 18 of tool B.

The tool is schematically represented in FIG. 7 at 24. The bed-plate 18 is extended towards the front as shown in 18A (see FIGS. 2, 4 and 7) to provide room for a loading station 62. Loading station 62 is in a shape corresponding to that of the tool 24. The blank workpiece to be pressed is placed thereon. FIG. 7 shows that the loading station 62 is located at an angle with respect to the tool 24; this angle corresponds to the angular opening $\alpha$, that is, the angle of rotation of the loading mechanism 37. The loading station 62 is placed to be out from the trajectory of the tools A–B and out from their supports 19, 20 as shown in FIG. 4.

The bed-plate 17 (FIG. 8) of tool A, has grooves 63 opening on top of the bed-plate. The grooves 63, as best seen in FIG. 8a and having a channel shape complementary to that of the head 6 of stay-rods 5 (FIG. 2). As seen at 63a (FIG. 8), the grooves 63 become widened towards the edge of bed-plate 17.

USE AND OPERATION

The plate C is normally permanently fixed on the press table, but can receive different successive sets of tools A – B for performance of successive work on various parts. The different sets of tools A – B, when not in use, are stored in open position, as seen in FIG. 4. The tool A is lifted above the tool B, supported by the pins 57 which are placed in the guiding columns 55; the safety upright 60 is also positioned.

To place a given set of tools in the press, the slide 4 of the press is lifted and the jacks 8 are operated so that the stay-rods 5 go down. A set of tools is brought in front of the press, by means of a carriage. The set of tools is then slid on the Plate C for example by operating a handle 64 (FIGS. 4 and 7) located at the end 18A on the bed-plate of tool B.

The locating motion of the two tools, which are still separated, is easy since the bottom of the bed-plate 18 is supported by the rollers 27. The guides 30 locate the bed-plate of the tool B, and the heads 6 of the stay-rods 5 automatically penetrate into the grooves 63 of the bed-plate 17 of the tool A.

When the bed-plate 18 of the tool B engages against the abutment pins 31, the two tools A – B are in correct position both with respect to the table and with respect of the slide of the press.

The next operation consists of clamping the tool B by means of clamps 33 which are tightened by the bolts 34 (FIG. 6). The bottom of said tool B is pressed on the top 29 of the plate C by retracting the rollers 27 against action of their springs 38. The jacks 8 are again operated to lift the stay-rods 5, the heads 6 of which are held in the grooves 63. This locks the tool A below the slide 2, 4 of the press. The lifting motion upon clamping the tool A and the dropping motion upon clamping the tool B provides additional clearance for easy disengagement of the safety upright 60 and to removal of the pins 57 locking the columns 55.

The worker may also furnish the loading device 37 with the suitable tool 38 appropriate to the part to be machined.

The above described loading of the tools in open position can be easily performed, even when the press is fitted with the ejection scoop 44 described with reference to FIG. 2, even when the said scoop is located between the slide and the table since it passes easily between the two tools A – B of the set.

When a set of tools has to be disassembled for change-over by another one, the press is again brought to its maximum open position. Pins 57 are introduced in the columns 55 to lock them, the safety upright 60 is placed. The stay-rods 5 are disengaged and the clamps 33 are opened so that the set of tools is again lifted by the springs 28 supporting the rollers 27 which permits the set to be slid out, and to load a new set of tools as explained above.

It is obvious that the various operations as for the loading as for the unloading must be performed only after retraction of the ejection rod or rods 10 (FIG. 2), which is performed by operating the above described control handle 13.

This invention is not restricted to the embodiment shown and described in detail, for various modifications thereof can moreover be applied thereto without departing from the scope of this invention as shown in the appended claims.

I claim:
1. A device for quickly interchanging tools in a press having a table (3) and a platen (2, 4) movable one with respect to the other in vertical relationship, comprising
an intermediate plate (C) rigidly connected to said table (3);
retractable rolling means (27), lateral guiding means (30), and abuting means (31) carried by said intermediate plate (C) and protruding therefrom;
a plurality of sets of upper and lower tools (A, 13; 23, 24) to be respectively mounted in said press, each set of upper and lower tools being provided with a base plate (17, 18);
the base plate (18) for said lower tool having portions (18a, 53, 53a) engaging, respectively, said rolling means, said lateral guiding means (30) and said abuting means (31) of said intermediate plate (C) to locate each set of tools with respect to said table (3) and plate (C) of said press;
strut members (55, 60) engagable between said lower (24) and upper (23) tools of each set of tools to space the upper and lower portions of said upper and lower tools of each set of tools by a predetermined distance;
and connecting means (5, 6) carried by said platen (2, 4) of the press and engaging said upper tool (A, 23) to rigidly connect said upper tool to said platen (2, 4) of the press thus allow disengagement of said strut members (55, 6) for operation of the press,
the lower tool (24) being carried by said table (3) on said intermediate plate (C) and said upper tool (23) carried by said platen (2, 4) of the press.

2. A device as set forth in claim 1 comprising further locking means (33, 34) carried by said intermediate plate (C) and engaging said base plate or bed (18) of the lower tool (24) whereby said base plate or bed is caused to bear against said intermediate plate (C) and is rigidly connected therewith and siad rolling means (27) retracted.

3. A device as set forth in claim 1 in which said connecting means (5, 6) carried by said plate of the press comprise movable stay rods (5) having a protruding head (6) and said upper tool is provided with longitudinal grooves (63) for location of said head of said stay rods during sliding of said base plate or bed of the lower tool on said rolling means and means for actuation (7, 8, 9) of said stay rods whereby said upper tool is raised thus allowing disengagement of said strut members after engagement of a set of tools.

4. A device as set forth in claim 3, wherein the actuation means (7, 8, 9) for the stay-rods, the protruding heads of which are inserted in the grooves opening in the top of each upper tool, comprise jack means.

5. A device as set forth in claim 1, wherein said strut members (55, 60) comprise guiding columns (55) connecting said upper and lower tools together, removable pins engaging said guiding columns for locking thereof in a position wherein the tools are separated from each other, and a safety removable upright (60);
and holding means provided in at least one of said upper and lower tools, to hold said members when the tools are not used separated from each other, and when the tools for working on workpieces to be press-machined are being positioned between said plate of the press and said table and thus permit introduction between the intermediate plate (C) on said table (3) and the upper plate of the press.

6. A device as set forth in claim 5, wherein the lower tool of each set of tools is provided with supports for the safety upright and for said removable pins utilized to hold the two tools separated when not in use.

7. A device as set forth in claim 1, wherein a rotating loading mechanism (37, 38, 39, 41) is provided, secured in the press, the loading mechanism having a loading tool and comprising means for interchanging said loading tool in dependency of the set of tools used.

8. A device as set forth in claim 7, wherein said loading mechanism is located on an extension of said intermediate plate to be out of the trajectory of said upper and lower tools, said tool of said loading mechanism having a shape complementary to the rough shape of the blank workpiece to be press machined and being angularly offset to the tool by a distance corresponding to the andle of which rotates said loading mechanism.

9. A device as set forth in claim 1, wherein the intermediate plate (C) is provided with apertures and grooves crossing it therethrough, to permit penetration by operating pins and ties for a double effect lower tool and for passing through said apertures and grooves.

10. A device as set forth in claim 1, wherein said plate of the press to which the upper tool is connected by said stay-rods is provided with at last one ejector (10) and wherein further there is designed a hand control mechanism (13) to cause the retraction of said ejector inside said plate during the removing and placing operations of the tools.

11. A device as set forth in claim 1, comprising an ejection scoop (44) further a link connection (45 – 52) between said upper platen (4) of the press and the ejection scoop (44) forming with said scoop a hinged parallelogram to insert the scoop (44) between the tools upon their opening and separate the scoop from the trajectory of the tools during the press stroke thereof while conveying off the part ejected upon termination of a previous work cycle.

* * * * *